US010609219B2

(12) United States Patent
D'Arcy et al.

(10) Patent No.: US 10,609,219 B2
(45) Date of Patent: \*Mar. 31, 2020

(54) SYSTEM AND METHOD FOR MANAGING RESOURCE SELECTION IN AN ENTERPRISE

(71) Applicant: Avaya Inc., Santa Clara, CA (US)

(72) Inventors: Paul D'Arcy, Clarinbridge (IE); Neil O'Connor, Lackagh (IE); John McGreevy, Galway (IE)

(73) Assignee: Avaya Inc., Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/058,284

(22) Filed: Aug. 8, 2018

(65) Prior Publication Data

US 2018/0352088 A1 Dec. 6, 2018

Related U.S. Application Data

(63) Continuation of application No. 14/572,012, filed on Dec. 16, 2014, now Pat. No. 10,122,859.

(51) Int. Cl.
*H04M 3/523* (2006.01)
*G06Q 30/00* (2012.01)
*G06Q 10/06* (2012.01)
*H04M 3/51* (2006.01)

(52) U.S. Cl.
CPC .. *H04M 3/5232* (2013.01); *G06Q 10/063112* (2013.01); *G06Q 30/016* (2013.01); *H04M 3/5175* (2013.01); *H04M 2203/402* (2013.01)

(58) Field of Classification Search
CPC ............. H04M 3/5232; H04M 3/5175; H04M 2203/402; G06Q 10/063112; G06Q 30/016

USPC .................................................. 379/265.03
See application file for complete search history.

(56) References Cited

U.S. PATENT DOCUMENTS

| 7,426,268 | B2 | 9/2008 | Walker et al. |
| 2006/0140390 | A1 | 6/2006 | Dezonno |
| 2009/0190743 | A1 | 7/2009 | Spottiswoode |
| 2010/0027778 | A1 | 2/2010 | Kumar et al. |

(Continued)

OTHER PUBLICATIONS

Intavong, Jirapon; Office Action; U.S. Appl. No. 14/572,012; dated Aug. 12, 2016; United States Patent and Trademark Office; Alexandria, VA.

(Continued)

*Primary Examiner* — Ahmad F. Matar
*Assistant Examiner* — Jirapon Intavong
(74) *Attorney, Agent, or Firm* — Stevens & Showalter LLP (57) ABSTRACT

A resource selection computing system for selecting at least one resource for one or more communication sessions in an enterprise is disclosed. The resource selection computing system includes a monitoring module for monitoring one or parameters associated with at least one communication session from at least one customer. The system further includes a database for storing the one or more monitored parameters. The system further includes a computation module for computing at least one connection score for the at least one customer with each of a plurality of resources based on the one or more stored parameters. The system further includes a resource selection module for selecting the at least one resource from the plurality of resources based on the at least one computed connection score.

15 Claims, 6 Drawing Sheets

(56) References Cited

U.S. PATENT DOCUMENTS

2011/0166911 A1   7/2011   Newman et al.
2016/0173694 A1   6/2016   D'Arcy et al.

OTHER PUBLICATIONS

Intavong, Jirapon; Final Office Action; U.S. Appl. No. 14/572,012; dated Feb. 23, 2017; United States Patent and Trademark Office; Alexandria, VA.
Intavong, Jirapon; Office Action; U.S. Appl. No. 14/572,012; dated Aug. 10, 2017; United States Patent and Trademark Office; Alexandria, VA.
Intavong, Jirapon; Final Office Action; U.S. Appl. No. 14/572,012; dated Feb. 23, 2018; United States Patent and Trademark Office; Alexandria, VA.
Intavong, Jirapon; Notice of Allowance; U.S. Appl. No. 14/572,012; dated Jul. 17, 2018; United States Patent and Trademark Office; Alexandria, VA.

SYSTEM AND METHOD FOR MANAGING RESOURCE SELECTION IN AN ENTERPRISE

CROSS REFERENCE TO RELATED APPLICATIONS

This application is a continuation of U.S. patent application Ser. No. 14/572,012, entitled "SYSTEM AND METHOD FOR MANAGING RESOURCE SELECTION IN AN ENTERPRISE," filed Dec. 16, 2014, the entire disclosure of which is incorporated by reference herein.

BACKGROUND

Field

Embodiments of the present invention generally relate to a system and method to manage selection of resources in an enterprise and particularly to a system and method for selecting a resource based on a relationship between a customer and a resource of an enterprise.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement ('SLA'), Customer Satisfaction ('CSAT'), and match rate. Contact center resources may include, agents, communication assets (e.g., number of voice trunks, number and bandwidth of video trunks, etc.), computing resources (e.g., a speed, a queue length, a storage space, etc.), and so forth.

Generally, a customer communicates with the contact center for multiple reasons such as, but not limited to, inquire about new products, complaints, misplaced credit or debit cards, and so forth. For example, a customer misplaces a credit card and desire to block the credit card to avoid any further damages. In order to provide services to the customers, resources of the contact center are selected.

Conventionally, multiple routing schemes were utilized to select a resource to handle a communication session associated with a customer. Some of the conventional routing schemes are, but not limited to, skill based routing, work based routing, and so forth. In some cases, the selected resource can be a stranger to the customer and there may be a possibility that the customer do not desire to share personal information such as a credit card number, or a pin number with the selected resource. In such a case, the customer is, however, forced to provide the information to the selected resource to avail services from the contact center. Further, these conventional techniques do not take into account a connection between a customer and a resource while selecting a resource for handling a communication session associated with the customer.

There is thus a need for a system and method for selecting a resource of an enterprise in a more efficient manner.

SUMMARY

Embodiments in accordance with the present invention provide a resource selection computing system for selecting at least one resource for one or more communication sessions in an enterprise. The resource selection computing system includes a monitoring module for monitoring one or more parameters associated with at least one communication session from at least one customer. The system further includes a database for storing the one or more monitored parameters. The system further includes a computation module for computing at least one connection score for the at least one customer with each of a plurality of resources based on the one or more stored parameters. The system further includes a resource selection module for selecting the at least one resource from the plurality of resources based on the at least one computed connection score.

Embodiments in accordance with the present invention further provide a computer-implemented method for selecting at least one resource for one or more communication sessions in an enterprise. The method includes monitoring one or more parameters of at least one communication session from at least one customer; storing the one or more monitored parameters in one or more databases; computing at least one connection score for the at least one customer with each of a plurality of resources based on the one or more stored parameters; and selecting at least one resource from the plurality of resources based on the at least one computed connection score.

Embodiments in accordance with the present invention further provide a computer-implemented method for routing at least one communication session to at least one resource in an enterprise. The method includes monitoring one or more parameters of the at least one communication session from at least one customer; storing the one or more monitored parameters in one or more databases; computing at least one connection score for the at least one customer with each of a plurality of resources based on the one or more stored parameters; selecting at least one resource from the plurality of resources based on the at least one computed connection score; and routing the at least one communication session to the at least one selected resource.

Embodiments of the present invention may provide a number of advantages depending on its particular configuration. First, embodiments of the present application provide a system and a method for managing selection of a resource for routing communication sessions to resources of an enterprise such as but not limited to a contact center. Embodiments of the present application provide a mechanism to determine a resource for handling an incoming customer requests. Next, embodiments of the present application provide a mechanism for resource selection based on a relationship between a customer and each of resources of the enterprise. By using the described mechanism, the enterprise can achieve desired business goals.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

The term "resource" may be used interchangeably in certain context with "agent" within this disclosure of the present invention when referring to one or more persons/entity servicing a contact in a contact center or a knowledge resource within an enterprise servicing back office transactions. In an embodiment of the present invention, the resource may be, but is not restricted to, an agent, an available agent, a reserve agent, a trainee agent, a Subject Matter Expert (SME), a supervisor, and so forth.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
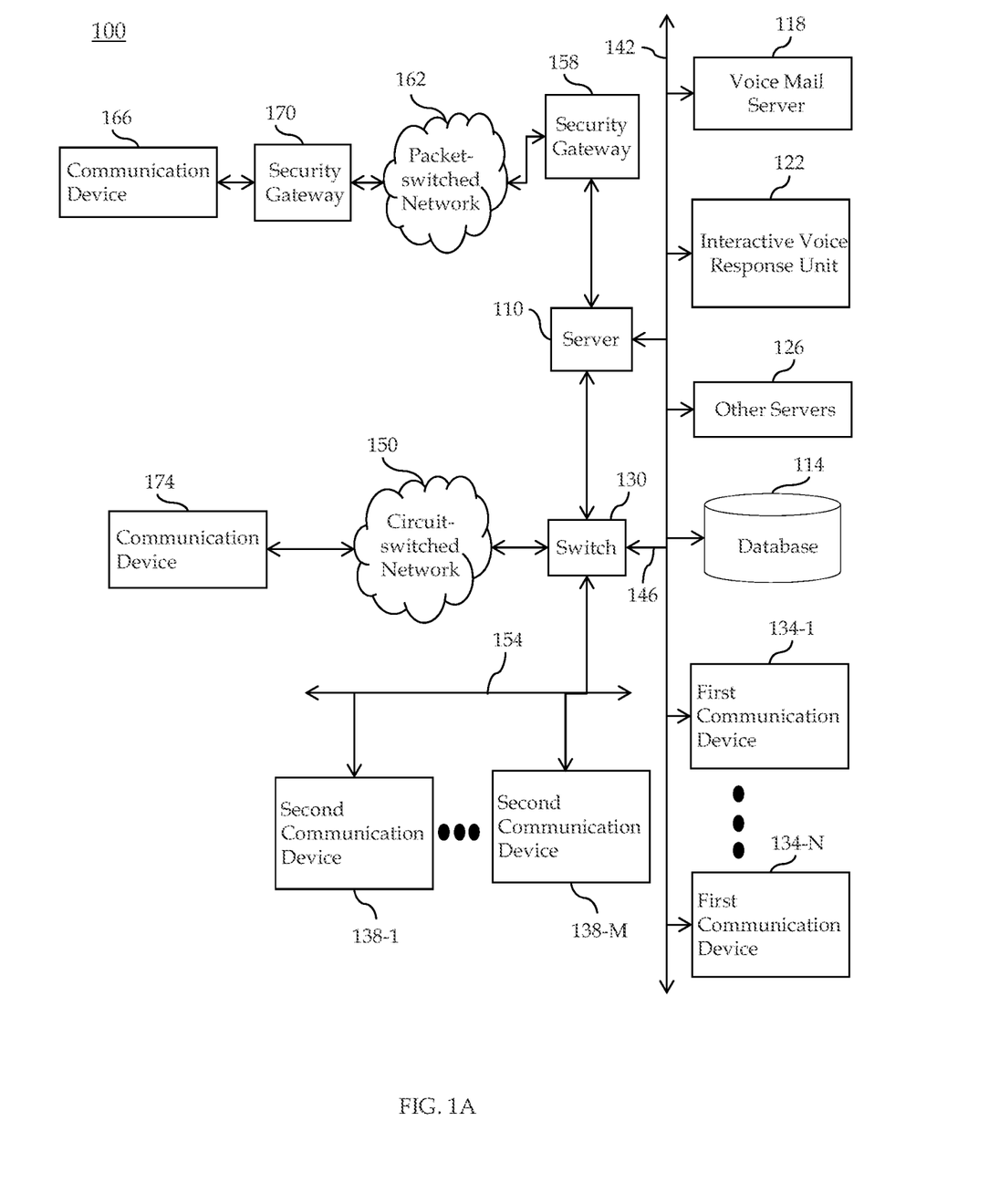
FIG. 1A illustrates a block diagram depicting a contact center, according to an embodiment of the present invention.

FIG. 1A shows an illustrative embodiment of the present invention. A contact center 100 comprises a server 110, a set of data stores or databases 114 containing contact or customer related information, resource related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations, or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, 58300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, customer communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
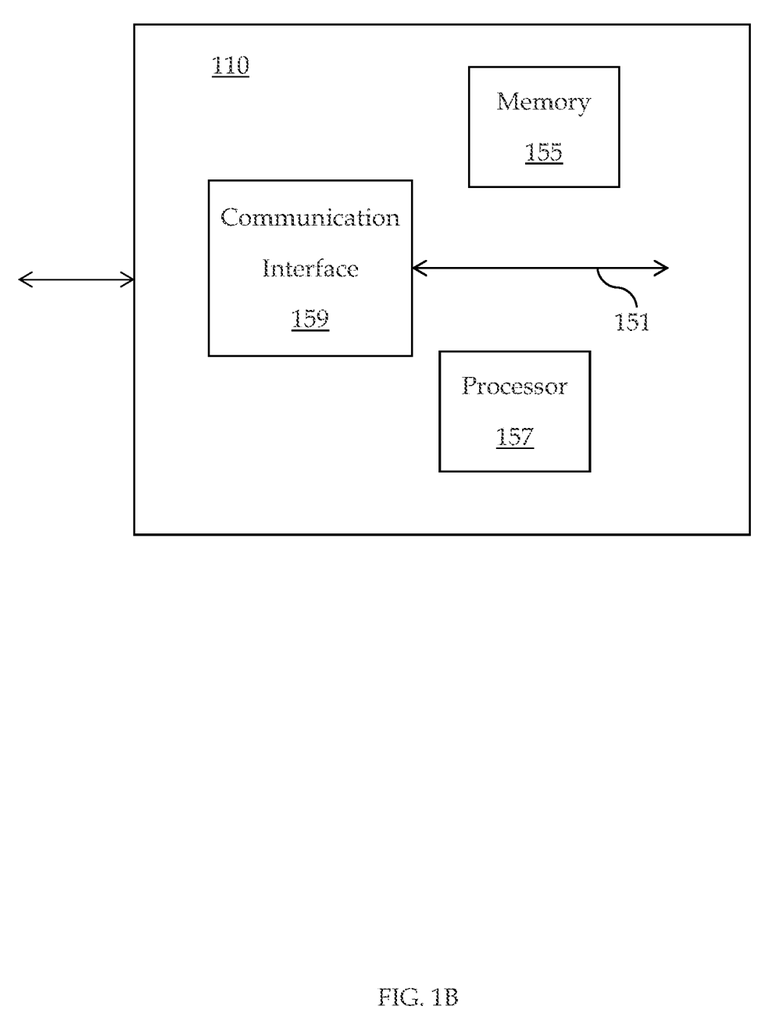
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end customers to access the services are described. The client side provides a customer with an interface for requesting services from the network, and the server side is responsible for accepting customer requests for services and providing the services transparent to the customer. By contrast in the peer-to-peer model or paradigm, each networked host runs both the client and server parts of an application program. Additionally, embodiments of the present invention do not require the presence of packet- or circuit-switched networks.

Figure 2:
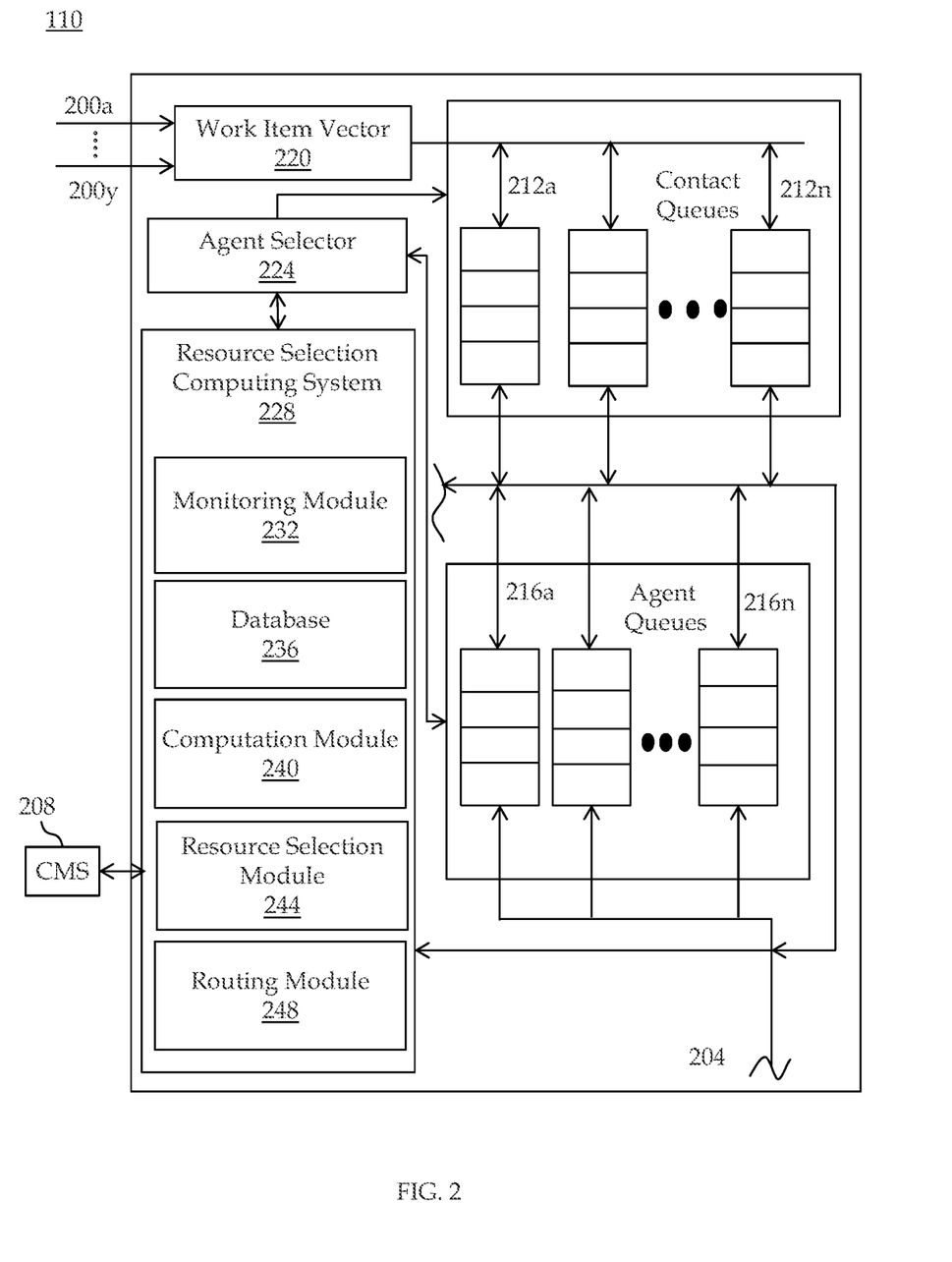
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact queues 212a-n and a separate set of agent queues 216a-n. Each contact queue 212a-n corresponds to a different set of agent queues, as does each agent queue 216a-n. Conventionally, contacts are prioritized and either are queued in individual ones of the contact queues 212a-n in their order of priority or are queued in different ones of a plurality of contact queues 212a-n that correspond to a different priority. Likewise, each agent's queues are prioritized according to his or her level of expertise or skill in that queue, and agents are queued in either individual ones of agent queues 216a-n in their order of expertise level, or in different ones of a plurality of agent queues 216a-n that correspond to a queue and each one of which corresponds to a different expertise level. In an embodiment of the present invention, the agent queue 216a-n may include a set of reserve agents queue in the contact center 100.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including a customer's identity, customer needs, contact center needs, current contact center queue lengths, a customer value, and an agent skill that is required for proper handling of the contact. Agents who are available for handling work items are assigned to the agent queues 216a-n based upon the skills that they possess. An agent may have multiple skills, and hence may be assigned to multiple agent queues 216a-n simultaneously. Furthermore, an agent may have different levels of skill expertise (e.g., skill levels 1–N in one configuration or merely primary skill levels and secondary skill levels in another configuration), and hence may be assigned to different agent queues 216a-n at different expertise levels.

In one configuration, the contact center 100 is operated by a contract operator (e.g., a supervisor or a manager of the contact center 100), and each of the work item queues 212a-n, and possibly each of the agent queues 216a-n, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, an agent selector 224 and a resource selection computing system 228. The agent selector 224 and the resource selection computing system 228 are stored either in the main memory or in a peripheral memory (e.g., disk, CD ROM, etc.) or some other computer-readable medium of the contact center 100. Further, the agent selector 224 monitors the occupants of the work item and agent queues 212a-n and 216a-n, respectively, and contact center objectives, rules, and policies and select agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100. Upon the completion of handling a work item, a generator (not shown) collects selected metrics for the work item. These metrics may include skills involved in servicing the work item, an identifier of a servicing agent, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

In an exemplary embodiment of the present invention, the resource selection computing system 228 is configured to monitor parameters associated with a communication session from a customer. Further, the resource selection computing system 228 is configured to store the monitored parameters in a database. Further, the resource selection computing system 228 is configured to compute a connection score for the customer with each of the resources in a contact center 100. Also, the resource selection computing system 228 is configured to select a resource based on the computed connection score. Further, the resource selection computing system 228 is configured to route the communication session to the selected agent. Also, the resource selection computing system 228 is configured to establish a communication link between the customer and the selected resource.

According to an embodiment of the present invention, the resource selection computing system 228 includes certain modules, such as, but is not restricted to, a monitoring module 232, a database 236, a computation module 240, a resource selection module 244, and a routing module 248. In some embodiments, one or more of the monitoring module 232, the database 236, the computation module 240, the resource selection module 244, and the routing module 248 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor parameters associated with a communication session, according to an embodiment of the present invention. In an embodiment of the present invention, the monitoring module 232 may monitor a type of the communication session. The type of the communication session may include, but not restricted to, a voice session, a video session, a Short Message Service (SMS), a web chat, an Instant Messaging (IM), an email communication, an Interactive Voice Response (IVR) session, a Voice over Internet Protocol (VOIP) session, and so forth. According to an embodiment of the present invention, the communication session may be initiated by a customer. Further, the monitoring module 232 may monitor static details of the communication session by monitoring inputs selected by the customer in an IVR menu of the contact center 100, according to an embodiment of the present invention. The monitoring module 232 may also monitor the conversation session to determine its context, according to an embodiment of the present invention. The context of the communication session may include, but not restricted to, a product inquiry support, a sales support, a health, or car policy support, a financial transaction support, and so forth. In an exemplary scenario, a customer may ask for 'iPad sales', then it may be determined that context of the communication session is a sales support. In another exemplary scenario, a customer may ask for a cure of a skin disease, then it may be determined that context of the communication session is a medical support. Furthermore, the monitoring module 232 may extract keywords from the communication session, according to an embodiment of the present invention. In an exemplary scenario, a customer may inquire about 'latest offers related to iPad sales', then the monitoring module 232 may extract keywords such as 'offers', 'sales' and 'iPad' from the communication session.

Further, the monitoring module 232 may monitor details of a communication device associated with the customer, according to an embodiment of the present invention. The details of the communication session may include, but not restricted to, a Media Access Control (MAC) address, an Internet Protocol (IP) address, a location information, display capabilities, and so forth. In an exemplary scenario, a customer 'A' may contact the contact center 100 from a public telephone and a customer 'B' may contact the contact center 100 by using a smart phone, where it may be determined that the smart phone of the customer 'B' has display capabilities and may be provided with graphical assistance, if necessary.

The monitoring module 232 may further monitor details associated with the customer, according to an embodiment of the present invention. The details of the customer may include, but not restricted to, a name, a telephone number, an email address, a social networking username, a customer identity number, communication history with the contact center 100, and so forth. In an exemplary scenario, a customer may communicate with the contact center 100 via an email then an email address may be extracted. Moreover, the monitoring module 232 may extract a profile of the customer from various social networking websites, according to an embodiment of the present invention. The profile of the customer may include, but not restricted to, personal information, contact information, educational background, business contacts, education and work histories, likes, hobbies, favorite sport teams, frequency of conversations with a resource, strength of a link between a customer and a resource, a history of queries, and so forth. The strength of a link may be defined by various parameters, e.g., a number of voice conversations between a customer and a resource, a number of communication sessions associated with a customer transferred to a resource, a number of email conversations between a customer and a resource, and so forth.

The monitoring module 232 may monitor a type of the customer associated with the communication session, according to an embodiment of the present invention. In an exemplary scenario, a customer may be, but is not restricted to, a platinum customer, or a high priority customer, a gold customer, or a medium priority customer, and/or a silver customer, or a low priority customer. A customer having higher revenue products and/or services provided by the contact center 100 may be referred as a high priority customer. A customer having medium revenue products and/or services provided by the contact center 100 may be referred as a medium priority customer. Further, a customer having low revenue products and/or services provided by the contact center 100, or may be a potential customer of the contact center 100 may be referred as a low priority customer. Further, the monitoring module 232 may monitor pre-defined statistical parameters of the communication session, according to an embodiment of the present invention. The pre-defined statistical parameters may include, but not restricted to, people of an organization, students of an educational institution such as a college, a school, or a common geographical region, and so forth, in an embodiment of the present invention.

The monitoring module 232 may further monitor details of a resource of the contact center 100, according to an embodiment of the present invention. The details of the resource may include, but not restricted to, a name, a phone number, an extension number, resource identification (ID), social networking usernames, of the contact center 100, and so forth. In an embodiment of the present invention, the monitoring module 232 may extract profiles of the resources from various social networking websites by using the resource ID, or their social networking usernames. The profile of a resource may include, but not restricted to, an agent's self-description, skill sets, likes, locations, and so forth. The resource's skill set may include, but is not limited to, a resource's interests, education and work histories, technical training, experience in supporting a particular industry, company, or contact, and so forth. The resource skill set may also include, but is not limited to, hobbies, hometowns, favorite sport teams and TV shows, cultural background, and so on, to the extent that such information may be relevant to support of customers to the contact center 100.

As used herein, the term "skill set" refers to a set of resource data that may be used by the contact center 100 to characterize a resource. Such resource data may include, but is not limited to, biographical resource data, demographic resource data, and external or internal behavioral resource data, to name a few. The behavioral data may include the resource's history with respect to the contact center 100 and/or any other entity or social media channel. However, the resource data is not limited in this regard and may include any other type of resource data used by the contact center 100 to characterize or classify resources. Further, the resource data may include any other resource data collected from one or more sources external to the contact center 100. Additionally, a resource profile may be raw data or processed resource data. That is, the resource data may be analyzed to characterize the resource and thereafter used to provide customized or personalized services to the customer. For example, a resource profile may be a set of values associated with a resource and a set of characteristics, where the values may be selected based on the resource data obtained. However, the disclosure is not limited in this regard and any other methods for evaluating resource data to provide services that may be used without limitation.

The monitoring module 232 may further monitor a state of a resource of the contact center 100, in an embodiment of the present invention. According to an embodiment of the present invention, the state of the resource may include, but not restricted to, a busy state, an available state, an out of seat, on a break, do not disturb, and so forth. In an embodiment of the present invention, the parameters of the communication session may include, but not restricted to, a type of a communication session, context of a communication session, static details, a profile of a customer, a profile of a resource, details of a communication device, and so forth.

The database 236 may store the monitored parameters of the communication session, according to an embodiment of the present invention. The database 236 may be an internal database of the contact center 100, in an embodiment of the present invention. In another embodiment of the present invention, the database 236 may be the database 114 of the contact center 100. The database 236 may be a third-party hosted database, according to yet another embodiment of the present invention. In an exemplary scenario, the database 236 may store profiles associated with the resources of the contact center 100, profiles of customers of the contact center 100, conversation histories between customers and resources, customer feedbacks, and so forth.

The computation module 240 may assign weights to the stored parameters associated with the communication session, according to an embodiment of the present invention. In an exemplary embodiment, a customer profile extracted from an internal database such as the database 236 of the contact center 100 may be given a higher weight than a customer profile extracted from an external database such as a database of a social networking website. In another exemplary scenario, if the customer is calling the contact center 100 for a product support, for example, a query related to malfunctioning of a laptop then a customer profile extracted from a database such as the database 236 of the contact center 100 may be given a higher weight.

The computation module 240 may also compute a length of a link between a customer and each resource of the contact center 100, according to an embodiment of the present invention. In an embodiment of the present invention, the length of the link may indicate how strong a relation between a customer and a resource is. In an exemplary scenario, a customer contacts a contact center 100 and two resources, a resource 'A' and a resource 'B' may be there to handle the communication session. The customer may have communicated with the resource 'A' ten times and with the resource 'B' five times, then the length of the link between the customer and the resource 'A' may be ten centimeters and the length of the link between the customer and the resource 'B' may be five centimeters. In another embodiment of the present invention, a short length of the link may indicate a distant relationship between a customer and a resource of the contact center 100, or vice versa.

Further, the computation module 240 may compute a connection score for the customer with each of the resources of the contact center 100 for the communication session, according to an embodiment of the present invention. In an embodiment of the present invention, the connection score may define a degree of separation between the customer and each resource of the contact center 100. The connection score, in terms of the degree of separation, may be defined by a number of nodes in a relationship path between the customer and each resource in the contact center 100, in another embodiment of the present invention. The nodes may represent intermediate contacts, or friends of the customer and the resources. In an exemplary scenario, the relationship path may be defined as 'friends with', 'friends of friend', and so forth. In another exemplary scenario, the relationship path may be defined as an '$n^{th}$ degree connection'; where 'n' may be an integer value. In an embodiment of the present invention, the connection score may define a close relationship between a customer and a resource of the contact center 100. The connection score may define a distant relationship between a customer and a resource of the contact center 100, in another embodiment of the present invention. This is further explained in conjunction with FIG. 5.

Further, the computation module 240 may compute a connection score for the communication session, according to an embodiment of the present invention. The computation module 240 may compute the connection score based on the stored parameters of the communication session, in an embodiment of the present invention.

In an exemplary scenario, a customer 'A' may communicate with a resource of the contact center 100 where it may be determined that a customer 'B' may be a common friend of the customer 'A', and a resource 'X' of the contact center 100. Therefore, a connection score one may be computed for a relationship between the customer 'A', and the resource 'X', and further, it may be determined that the customer 'A', and the resource 'X' are separated by a degree of one. Next, the customer 'B' may be a friend of the customer 'A', a customer 'C' may be a friend of the resource 'X' of the contact center 100, and the customer 'B' and customer 'C' may also be friends. Therefore, a connection score two may be computed for a relationship between the customer 'A', and the resource 'X', and further, it may be determined that the customer 'A', and the resource 'X' are separated by a degree of two.

Further, the computation module 240 may compute the connection score for the communication session based on a predefined set of rules, according to an embodiment of the present invention. The predefined set of rules may include, but not limited to, business strategies, or business processes of the contact center 100, in an embodiment of the present invention. In an exemplary scenario, the business strategy may be, but not limited to, a work selection strategy, or a resource selection strategy. Further, the computation module 240 may compute the connection score based on the pre-stored statistical parameters, according to an embodiment of the present invention.

In an exemplary scenario, it may be monitored that two customers, a customer 'A' and a customer 'B' may be a single degree of separation away from each other, and may further be determined that there may be 30% possibility that the two customers work in a same organization, and there may be 80% possibility that the two customers work in a same industry. Now, the customer 'A' contacts the contact center 100, and may be connected with a resource 'C', as a part of a review of the communication session, it may be further determined that the resource 'C' may be a good match for the customer 'A', and as a result it may be determined that the resource 'C' may also be a good match for customers similar to the customer 'A'. Further, when the customer 'B' contacts the contact center 100, based on the previous details that the customer 'A' and customer 'B' may be a single degree of separation away from each other, and the resource 'C' may have a good record with customers of similar profiles, then a connection score for the resource 'C' and the resource 'B' may be computed as one.

The resource selection module 244 may select a resource from the resources of the contact center 100, in an embodiment of the present invention. The resource selection module 244 may select a resource from the resources based on the computed connection score, according to an embodiment of the present invention. In an exemplary scenario, a computed connection score for a customer with a resource 'A', and the customer with a resource 'B' may be two and four respectively then a resource with a higher computed connection score may be selected. In an embodiment of the present invention, the resource selection module 244 may select a resource with a least computed connection score. The resource selection module 244 may select a resource from the resources based on the computed connection score, context of the communication session, or a combination thereof, in another embodiment of the present invention.

In an embodiment of the present invention, the resource selection module 244 may select a resource based on the computed connection score, the predefined set of rules, context of the communication session, and so forth. In an embodiment of the present invention, the resource selection module 244 may enable a supervisor of the contact center 100 to select a resource manually in order to manage the communication session. In another embodiment of the present invention, the resource selection module 244 may automatically select a resource from the resources to manage the communication session.

The routing module 248 may route the communication session to the selected resource, according to an embodiment of the present invention. The routing module 248 may establish a communication link between the customer and the selected resource of the contact center 100. Further, according to an embodiment of the present invention, the routing module 248 may route the communication session to a waiting queue of the selected resource, in case, the selected resource is busy in handling another communication session. In an embodiment of the present invention, the resource may be, but is not restricted to, an agent, an available agent, a reserve agent, a trainee agent, a Subject Matter Expert (SME), a supervisor, and so forth.

Figure 3:
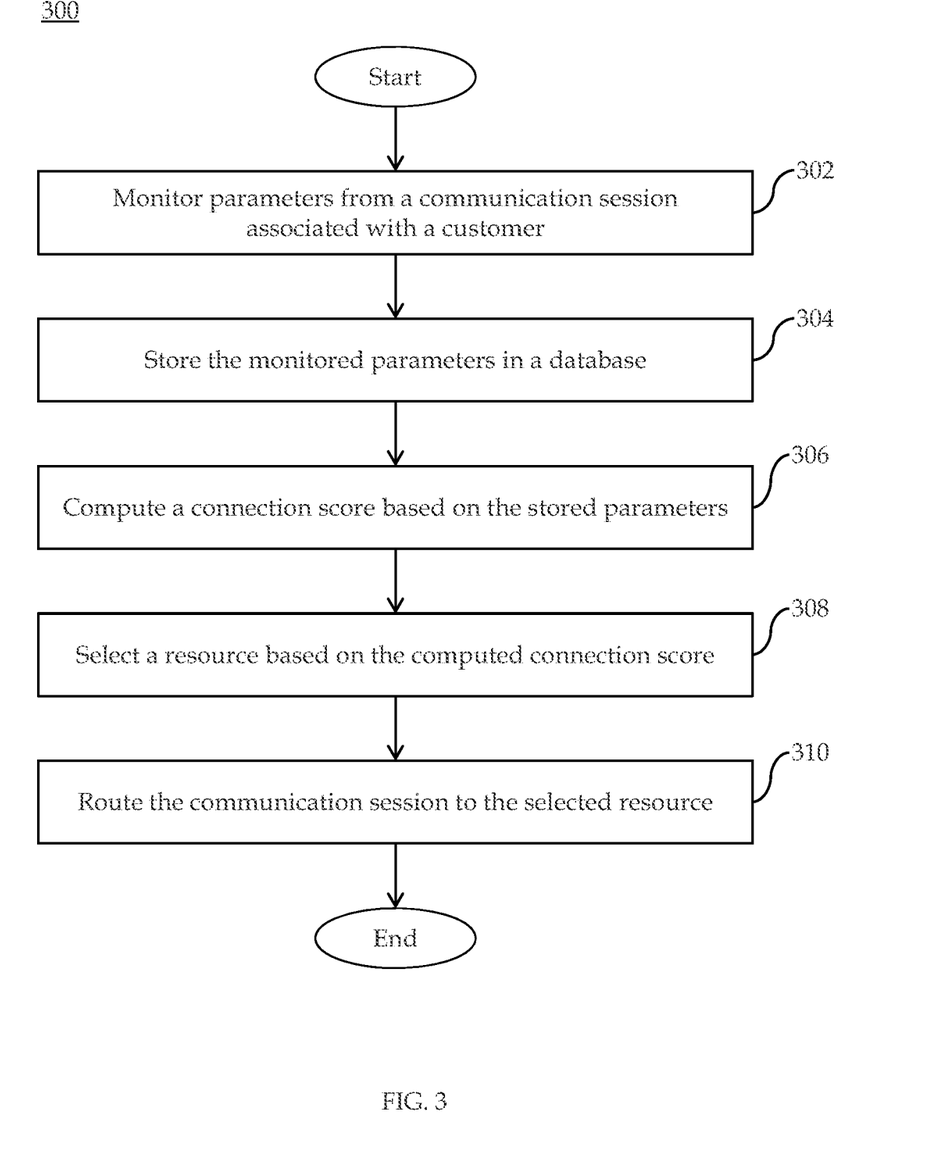
FIG. 3 depicts a flowchart of a method for selecting a resource for a communication session, according to an embodiment of the present invention.

FIG. 3 depicts a flowchart of a method 300 for selecting a resource for a communication session, according to an embodiment of the present invention At step 302, the resource selection computing system 228 monitors parameters associated with the communication session, according to an embodiment of the present invention. In an embodiment of the present invention, the resource selection computing system 228 monitors a type of the communication session. The type of the communication session may include, but not restricted to, a voice session, a video session, a Short Message Service (SMS), a web chat, an Instant Messaging (IM), an email communication, an Interactive Voice Response (IVR) session, a Voice over Internet Protocol (VOIP) session, and so forth. Further, the resource selection computing system 228 monitors static details of the communication session by monitoring inputs selected by the customer in an IVR menu of the contact center 100, according to an embodiment of the present invention. The resource selection computing system 228 also monitors the conversation session to determine its context, according to an embodiment of the present invention. The context of the communication session may include, but not restricted to, a product inquiry support, a sales support, a health, or car policy support, a financial transaction support, and so forth. Furthermore, the resource selection computing system 228 extracts keywords from the communication session, according to an embodiment of the present invention.

Further, the resource selection computing system 228 monitors details of a communication device associated with the customer, according to an embodiment of the present invention. The details of the communication session may include, but not restricted to, a Media Access Control (MAC) address, an Internet Protocol (IP) address, a location information, display capabilities, and so forth. The resource selection computing system 228 also monitors details associated with the customer, according to an embodiment of the present invention. The details of the customer may include, but not restricted to, a name, a telephone number, an email address, a social networking username, a customer identity number, communication history with the contact center 100, and so forth. Moreover, the resource selection computing system 228 extracts social networking profiles of the customer from various social networking websites, according to an embodiment of the present invention. The profile of the customer may include, but not restricted to, personal information, contact information, educational background, business contacts, education and work histories, likes, hobbies, favorite sport teams, frequency of conversations with a resource, strength of a link between a customer and a resource, a history of communication sessions, and so forth.

The resource selection computing system 228 monitors a type of the customer associated with the communication session, according to an embodiment of the present invention. In an exemplary scenario, a customer may be, but is not restricted to, a platinum customer, a gold customer, and/or a silver customer. Furthermore, the resource selection computing system 228 monitors details of a resource of the contact center 100, according to an embodiment of the present invention. The details of the resource may include, but not restricted to, a name, a phone number, an extension number, resource identification (ID), social networking usernames, of the contact center 100, and so forth.

At step 304, the resource selection computing system 228 stores the monitored parameters in a database, according to an embodiment of the present invention. In an embodiment of the present invention the database may be an internal database of the contact center 100, an external database, or a third party hosted server.

Next, at step 306, the resource selection computing system 228 computes a connection score for the communication session based on the stored parameters, according to an embodiment of the present invention. In an embodiment of the present invention, the connection score may be defined by, but not restricted to, a degree of separation between the customer and each of the resources of the contact center 100, strength of a link between the customer and each resource in the contact center 100, and so forth. Further, the resource selection computing system 228 computes the connection score for the communication session based on a predefined set of rules, according to an embodiment of the present invention. Further, the resource selection computing system 228 computes the connection score based on pre-stored statistical parameters, according to an embodiment of the present invention.

At step 308, the resource selection computing system 228 selects a resource based on the computed connection score, according to an embodiment of the present invention. In an exemplary embodiment, the computed connection score for the customer with a resource 'A' and with a resource 'B' may be computed as two and four respectively, then a resource having a higher computed connection score may be selected. In an embodiment of the present invention, the resource selection computing system 228 selects a resource with a least computed connection score. The resource selection computing system 228 selects a resource from the resources based on the computed connection score, context of the communication session, and so forth, in another embodiment of the present invention.

Thereafter, at step 310, the resource selection computing system 228 routes the communication session to the selected resource, according to an embodiment of the present invention. The resource selection computing system 228 establishes a communication link between the customer and the selected resource of the contact center 100, in an embodiment of the present invention. In an embodiment of the present invention, the resource may be, but is not restricted to, an agent, an available agent, a reserve agent, a trainee agent, a Subject Matter Expert (SME), a supervisor, and so forth.

Figure 4:
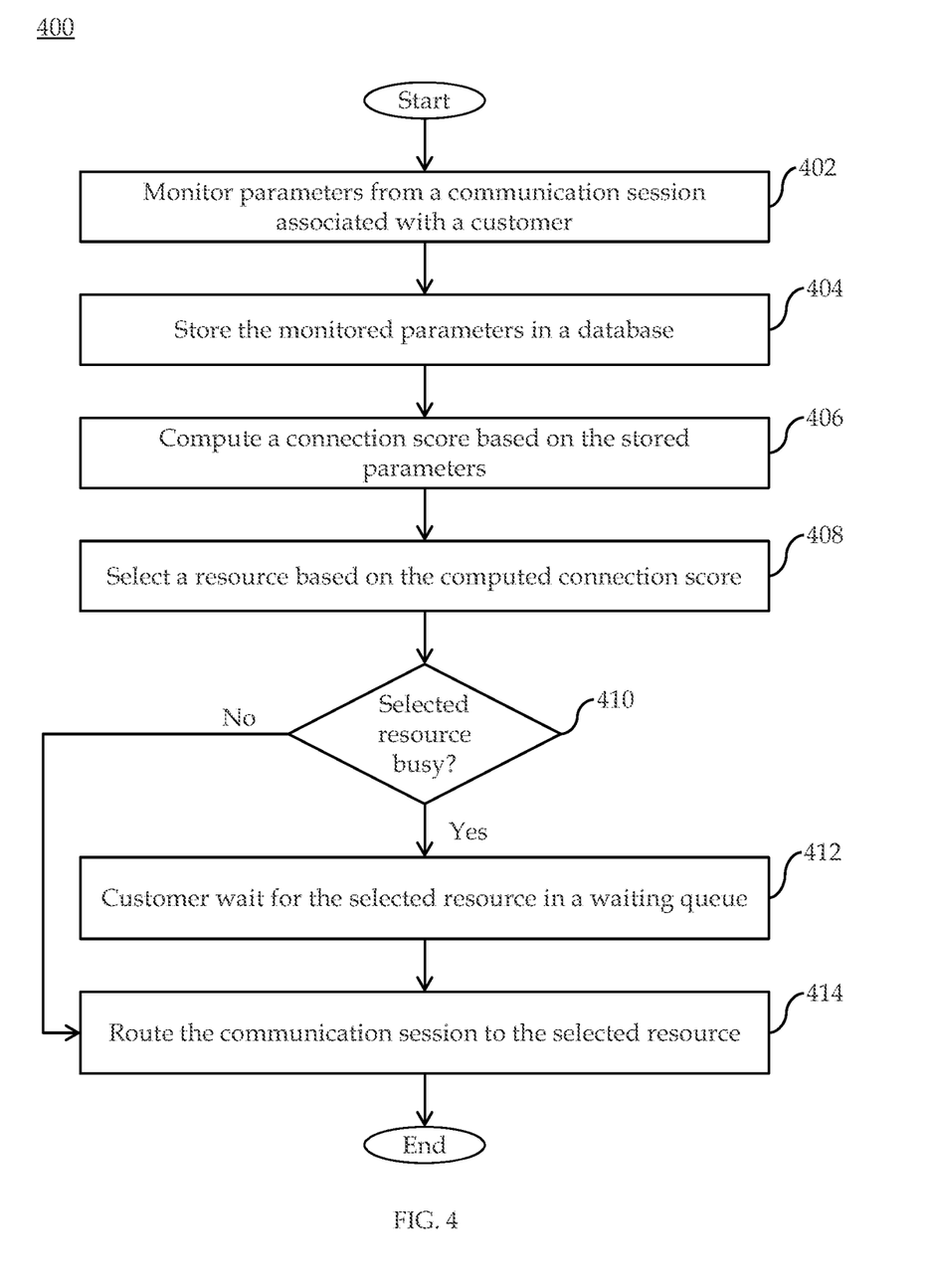
FIG. 4 depict a flowchart of a method for selecting a resource for a communication session, according to an embodiment of the present invention.

FIG. 4 depicts a flowchart of a method 400 for selecting a resource for a communication session, according to an embodiment of the present invention.

At step 402, the resource selection computing system 228 monitors parameters associated with the communication session, according to an embodiment of the present invention. In an embodiment of the present invention, the resource selection computing system 228 monitors a type of the communication session. Further, the resource selection computing system 228 monitors static details of the communication session by monitoring inputs selected by the customer in an IVR menu of the contact center 100, according to an embodiment of the present invention. The resource selection computing system 228 also monitors the communication session to determine its context, according to an embodiment of the present invention. Furthermore, the resource selection computing system 228 extracts keywords from the communication session, according to an embodiment of the present invention.

Further, the resource selection computing system 228 monitors details of a communication device associated with the customer, according to an embodiment of the present invention. The resource selection computing system 228 also monitors details associated with the customer and/or each resource, according to an embodiment of the present invention. The details of the customer may include, but not restricted to, a name, a telephone number, an email address, a social networking username, a customer and/or resource identification number, communication history with the contact center 100, and so forth. Moreover, the resource selection computing system 228 extracts profiles of the customer and/or resources of the contact center 100 from various social networking websites, according to an embodiment of the present invention. The profiles may include, but not restricted to, personal information, contact information, educational background, business contacts, education and work histories, likes, hobbies, favorite sport teams, an extension number, resource identification (ID), frequency of conversations with a resource, strength of a link between a customer and a resource, a history of queries, and so forth.

The resource selection computing system 228 monitors a type of the customer associated with the communication session, according to an embodiment of the present invention. In an exemplary scenario, a customer may be, but is not restricted to, a platinum customer, or a high priority customer, a gold customer, or a medium priority customer, and/or a silver customer, or a low priority customer. The resource selection computing system 228 monitors a state of each of the resources, in an embodiment of the present invention.

At step 404, the resource selection computing system 228 stores the monitored parameters in a database, according to an embodiment of the present invention. In an embodiment of the present invention, the database may be an internal database of the contact center 100. The database may be an external database, or a third party hosted server, in another embodiment of the present invention.

Next, at step 406, the resource selection computing system 228 computes a connection score for the communication session based on the stored parameters, according to an embodiment of the present invention. In an embodiment of the present invention, the connection score may be defined, but not restricted to, as a degree of separation for the customer with each of the resources in the contact center 100, strength of a link between the customer and each resource in the contact center 100 and so forth.

Further, the resource selection computing system 228 computes the connection score based on a predefined set of rules, according to an embodiment of the present invention. Further, the resource selection computing system 228 computes the connection score based on pre-stored statistical parameters, according to an embodiment of the present invention.

At step 408, the resource selection computing system 228 selects a resource based on the computed connection score, according to an embodiment of the present invention. In an exemplary scenario, the computed connection score for the customer with a resource 'A' and with a resource 'B' may be computed as five and seven respectively, then a resource having a least computed connection score may be selected. In an embodiment of the present invention, the resource selection computing system 228 selects a resource with a highest computed connection score. The resource selection computing system 228 selects a resource from the resources based on the computed connection score, context of the communication session, and so forth, in another embodiment of the present invention.

Thereafter, at step 410, the resource selection computing system 228 determines whether the selected resource is busy or not, according an embodiment of the present invention. When it is determined that the selected resource is busy, i.e., the selected resource is busy in handling another communication session then the method 400 proceeds towards step 412. When it is determined the selected resource is available then the method 400 proceeds towards step 414.

At step 412, the resource selection computing system 228 routes the customer to a waiting queue to wait for the selected resource, according to an embodiment of the present invention. As soon as the resource finishes a previously assigned communication session, the communication session is routed to the selected resource at step 414.

Further, at the step 414, the resource selection computing system 228 routes the communication session to the selected resource, according to an embodiment of the present invention. The resource selection computing system 228 further establishes a communication link between the customer and the selected resource of the contact center 100, in an embodiment of the present invention. The resource may be, but is not restricted to, an agent, an available agent, a reserve agent, a trainee agent, a Subject Matter Expert (SME), a supervisor, and so forth, in an embodiment of the present invention.

Figure 5:
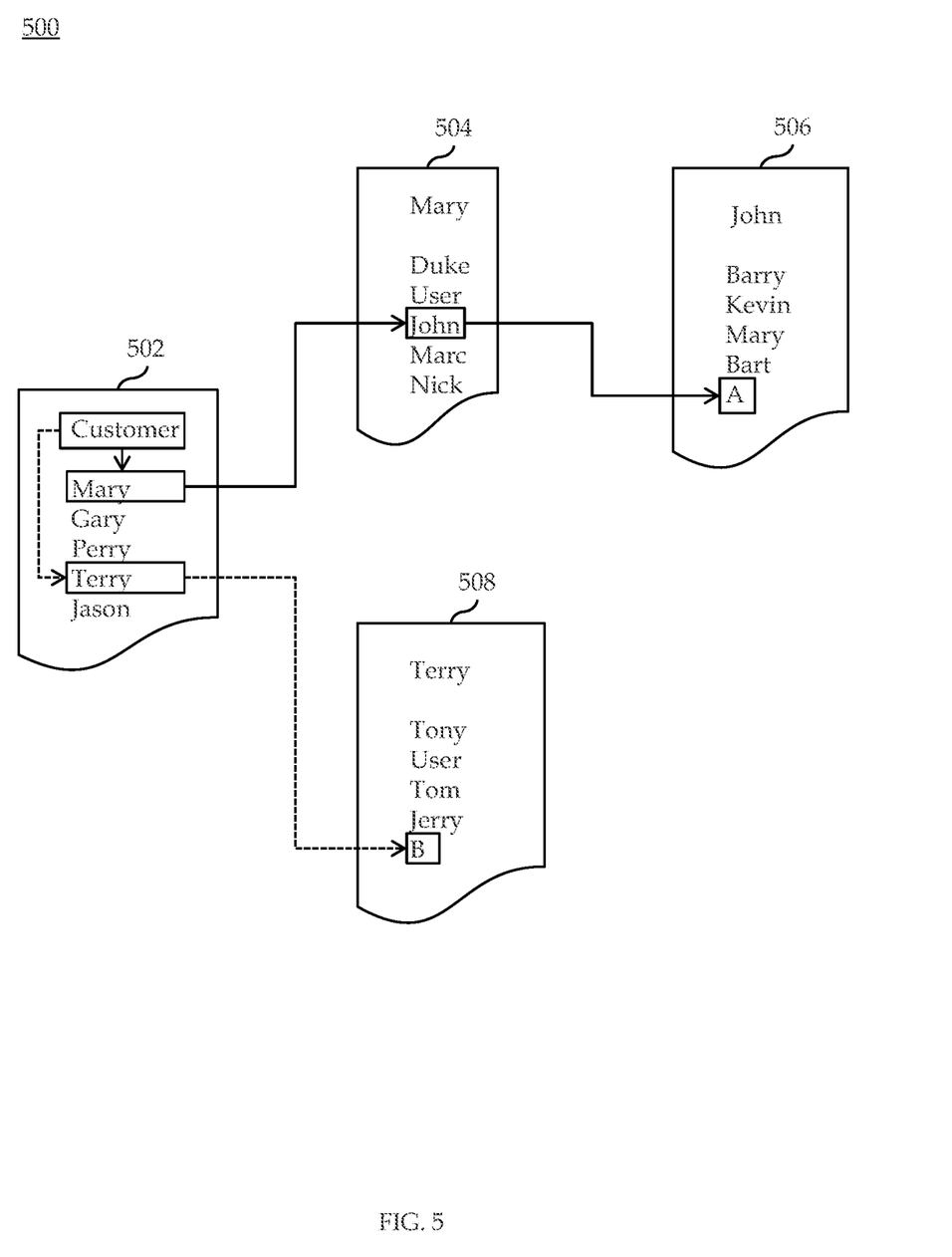
FIG. 5 depicts an exemplary scenario for routing a communication session to a resource of an enterprise, according to an embodiment of the present invention.

FIG. 5 depicts an exemplary scenario for selecting a resource for a communication session, according to an embodiment of the present invention. Parameters such as a product support, and social networking username associated with a customer of the communication session is received by monitoring the communication session. The social networking username may then be used to extract social networking profiles of the customer from multiple social networking websites. Similarly, social networking profiles of resources 'A' and resource 'B' may be extracted from multiple social networking websites by using their usernames, their resource IDs. Based on the extracted parameters and social networking profiles, a connection score may be computed for each resource 'A' and resource 'B'. From the social networking profile of the customer 502, it may be determined that a friend 'Mary' of the customer, may also friend with 'John' in a friend list of 'Mary' 504. Further, from a friend list of 'John' 506 it may be determined that 'John' may be a friend with the resource 'A'. Therefore, by using predefined set of rules, a connection score 'two' may be computed for the communication session as there are two intermediate contacts to define a relationship path between the customer and the resource 'A'. Additionally, it is determined that a friend 'Terry' in the social networking profile of the customer 502 is a common friend of the customer and the resource 'B' as shown in FIG. 5. Therefore, by using predefined set of rules, a connection score 'one' may be computed for the communication session as there is a common contact to define a relationship path between the customer and the resource 'B'. Further, based on the computed connection score and the monitored parameters, i.e., a product support, the resource 'B' is selected to provide customer services to the customer. The communication session is routed to the selected resource 'B' and a communication link is then established between the customer and the resource 'B'. While the present invention has been described with respect to certain specific embodiments, it will be apparent to those skilled in the art that various changes and modifications may be made without departing from the spirit and scope of the invention.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computation efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A resource selection computing system for selecting at least one resource for one or more communication sessions in an enterprise, the system comprising: a server comprising a processor and a memory storing software instructions, the processor coupled to the memory executes the software instructions to: monitor one or more parameters associated with at least one communication session from at least one customer, wherein a database stores the one or more monitored parameters; compute at least one connection score for the at least one customer with each of a plurality of resources based on a degree of separation between the at least one customer and each of the plurality of resources, determine the degree of separation between a first customer and a resource, wherein the degree of separation is determined to be one when a second customer is a common friend of the first customer and the resource; and automatically select the at least one resource from the plurality of resources based on the at least one computed connection score.

2. The system of claim 1, wherein the processor further executes the software instructions to extract keywords from the one or more monitored parameters of the communication session.

3. The system of claim 1, wherein the processor further executes the software instructions to query one or more social networking websites for retrieving one or more profiles associated with each of the plurality of resources and one or more profiles associated with the at least one customer.

4. The system of claim 1, wherein the processor further executes the software instructions to further compute the at least one connection score based on a percent possibility that the first customer and the second customer work in the same industry.

5. The system of claim 1, wherein the processor further executes the software instructions to compute the at least one connection score based on predefined set of rules.

6. The system of claim 1, further computes the at least one connection score based on a strength of link comprising at least one of a number of voice conversations between a customer and a resource, a number of communication sessions associated with a customer transferred to a resource, or a number of email conversations between a customer and a resource.

7. The system of claim 1, wherein the processor further executes the software instructions to determine at least one state of the at least one selected resource and routes the at least one communication session to the at least one selected resource based on the at least one determined state.

8. The system of claim 1, wherein the processor further executes the software instructions to further compute the at least one connection score based on a percent possibility that the first customer and the second customer work in the same organization.

9. A computer-implemented method for selecting at least one resource for one or more communication sessions in an enterprise, the method comprising: monitoring one or more parameters of at least one communication session from at least one customer; storing the one or more monitored parameters in one or more databases; computing by a processor at least one connection score for the at least one customer with each of a plurality of resources based on a degree of separation between the at least one customer and each of the plurality of resources, determine the degree of separation between a first customer and a resource, wherein the degree of separation is determined to be one when a second customer is a common friend of the first customer and the resource; and automatically selecting at least one resource from the plurality of resources based on the at least one computed connection score.

10. The method of claim 9, further extracts keywords from the one or more monitored parameters of the communication session.

11. The method of claim 9, further queries one or more social networking websites for retrieving one or more profiles associated with each of the plurality of resources and one or more profiles associated with the at least one customer.

12. The method of claim 9, further computes the at least one connection score based on a percent possibility that the first customer and the second customer work in the same industry.

13. The method of claim 9, further computes the at least one connection score based on predefined set of rules.

14. The method of claim 9, further determines at least one state of the at least selected resource and routes the at least one communication session to the at least one selected resource based on the at least one determined state.

15. The method of claim 9, further computes the at least one connection score based on a strength of link comprising at least one of a number of voice conversations between a customer and a resource, a number of communication sessions associated with a customer transferred to a resource, or a number of email conversations between a customer and a resource.

* * * * *